US012669725B2

(12) United States Patent
Hase et al.

(10) Patent No.: US 12,669,725 B2
(45) Date of Patent: Jun. 30, 2026

(54) LIQUID CRYSTAL PANEL, LIQUID CRYSTAL PANEL APPARATUS, AND IMAGER

(71) Applicant: Japan Display Inc., Tokyo (JP)

(72) Inventors: Kasumi Hase, Tokyo (JP); Koichi Igeta, Tokyo (JP); Yoshiro Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/806,799

(22) Filed: Aug. 16, 2024

(65) Prior Publication Data

US 2025/0068008 A1 Feb. 27, 2025

(30) Foreign Application Priority Data

Aug. 23, 2023 (JP) ................................. 2023-135203

(51) Int. Cl.
| | |
|---|---|
| *G02F 1/1333* | (2006.01) |
| *G02F 1/1334* | (2006.01) |
| *G02F 1/1335* | (2006.01) |
| *G02F 1/1339* | (2006.01) |

(52) U.S. Cl.
CPC ...... *G02F 1/133388* (2021.01); *G02F 1/1334* (2013.01); *G02F 1/133512* (2013.01); *G02F 1/1339* (2013.01)

(58) Field of Classification Search
CPC ............. G02F 1/133388; G02F 1/1334; G02F 1/133512; G02F 1/1339
See application file for complete search history.

(56) References Cited

U.S. PATENT DOCUMENTS

| | | | | |
|---|---|---|---|---|
| 5,299,289 | A * | 3/1994 | Omae | ............... G02F 1/133371 |
| | | | | 349/5 |
| 2002/0030784 | A1* | 3/2002 | Onaka | ................... G02F 1/1345 |
| | | | | 349/153 |
| 2012/0127140 | A1* | 5/2012 | Ryan | ................. G02F 1/133555 |
| | | | | 345/207 |
| 2017/0195538 | A1* | 7/2017 | Saitoh | .................... H04N 23/54 |
| 2021/0405407 | A1* | 12/2021 | Sun | ........................ G02F 1/1339 |

FOREIGN PATENT DOCUMENTS

| | | | | | |
|---|---|---|---|---|---|
| CN | 110928016 | A | * | 3/2020 | ........... G02F 1/1333 |
| JP | 2022-167026 | A | | 11/2022 | |

OTHER PUBLICATIONS

Espacenet English machine translation of CN110928016A (Year: 2020).*

* cited by examiner

*Primary Examiner* — David Y Chung
(74) *Attorney, Agent, or Firm* — Michael Best & Friedrich LLP

(57) ABSTRACT

A liquid crystal panel is configured to include: a first substrate having a flat plate shape; a second substrate arranged to face the first substrate; a liquid crystal sandwiched between the first substrate and the second substrate; a hole region, at least a part of which is set to either a light passage state or a light shielding state, the hole region being arranged between substrates that are the first substrate and the second substrate; a seal part arranged between the substrates to surround the hole region and have a cylindrical shape; and a structure arranged between the substrates to be in contact with an outer surface of the seal part and surround the seal part, and the liquid crystal is sealed into the cylinder configuring the seal part.

7 Claims, 6 Drawing Sheets

LIQUID CRYSTAL PANEL, LIQUID CRYSTAL PANEL APPARATUS, AND IMAGER

CROSS-REFERENCE TO RELATED APPLICATION

The present application claims priority to Japanese Patent Application No. 2023-135203 filed on Aug. 23, 2023, the disclosure of which is incorporated herein by reference.

TECHNICAL FIELD OF THE INVENTION

The present invention relates to a liquid crystal panel, a liquid crystal panel apparatus, and an imager.

BACKGROUND OF THE INVENTION

Liquid crystal panels allowing light to pass through and to be shielded have been known. Such a liquid crystal panel generally has a structure in which a liquid crystal layer is sandwiched between two glass substrates including a transparent electrode, as described in Japanese Patent Application Laid-Open Publication No. 2022-167026 (Patent Document 1).

SUMMARY OF THE INVENTION

Such a liquid crystal panel may be desirably set in use to either a light passage state or a light shielding state by control for an electric field applied to at least a part of a hole region formed between the substrates, the hole region excluding a light shielding film.

However, in the liquid crystal panel simply provided with the hole region excluding the light shielding film, light that attempts to pass through the hole region may be undesirably affected.

Under such circumstances, it is desirable to provide a technique for a liquid crystal panel having the hole region, at least a part of which is set to either a light passage state or a light shielding state, and being capable of suppressing the influence on the light that attempts to pass through the hole region.

According to an embodiment, in a liquid crystal panel including: a first substrate having a flat plate shape and allowing light to pass through; a second substrate arranged to face the first substrate and allowing light to pass through; and a liquid crystal sandwiched between the first substrate and the second substrate, the liquid crystal panel further includes: a hole region, at least a part of which is set to either a light passage state or a light shielding state, the hole region being arranged between substrates that are the first substrate and the second substrate; a seal part arranged between the substrates to surround the hole region and have a cylindrical shape; and a structure arranged between the substrates to be in contact with an outer surface of the seal part and surround the seal part, and the liquid crystal is sealed into the cylinder configuring the seal part.

According to an embodiment, in a liquid crystal panel apparatus including: a first substrate having a flat plate shape and allowing light to pass through; a second substrate arranged to face the first substrate and allowing light to pass through; a liquid crystal sandwiched between the first substrate and the second substrate; and a controller controlling a voltage applied to the liquid crystal, the liquid crystal panel apparatus further includes: a hole region, at least a part of which is set to either a light passage state or a light shielding state, the hole region being arranged between substrates that are the first substrate and the second substrate; a seal part arranged between the substrates to surround the hole region and have a cylindrical shape; and a structure arranged between the substrates to be in contact with an outer surface of the seal part and surround the seal part, the liquid crystal is sealed into the cylinder configuring the seal part, and the controller sets at least the part of the hole region to either the light passage state or the light shielding state by controlling the voltage.

According to an embodiment, an imager includes: an optical system; the liquid crystal panel apparatus; and an imaging element receiving light that has passed through the optical system and the hole region of the liquid crystal panel apparatus.

BRIEF DESCRIPTIONS OF THE DRAWINGS

DESCRIPTIONS OF THE PREFERRED EMBODIMENTS

<Reason for Study>

Before describing embodiments of the present invention, a reason for study made by the present inventors will be described.

Regarding liquid crystal panels, the present inventors have focused on a liquid crystal panel including a hole region which excludes a light shielding film and at least a part of which can be switched and set to either a light passage state or a light shielding state by control for an electric field to be applied, the hole region being arranged between substrates. The liquid crystal panel having such a function can be used as a shutter or a diaphragm of the imager or as a coded aperture for encoded imaging when being arranged, for example, in front of and/or behind an optical system of the imager. The liquid crystal panel has, for example, the following configuration.

The liquid crystal panel includes: a first substrate having a flat plate shape and allowing visible light to pass through; a second substrate arranged to face the first substrate and allowing visible light to pass through; and a liquid crystal sandwiched between the first substrate and the second substrate. The liquid crystal panel further includes: a plurality of spacers arranged between the first substrate and the second substrate; and a light shielding film arranged inside the second substrate and having a hole formed therein. The spacers are formed to maintain a uniform distance between the substrates.

A region (also referred to as hole region) corresponding to the hole of the light shielding film between the substrates of the liquid crystal panel is set to either the light passage state or the light shielding state by control for an electric field applied to the liquid crystal in this hole region. If the hole region of the liquid crystal panel is set to the light passage state, the light passes through this hole region. On the other hand, if the hole region of the liquid crystal panel is set to the light shielding state, the light is not allowed to pass through this hole region.

Incidentally, when the spacer is arranged in the hole region between the substrates of the liquid crystal panel, the spacer disturbs orientation of the liquid crystal. Therefore, even if the hole region is set to the light shielding state, the light is shielded less than expected, and a phenomenon of causing the light to slightly pass through the hole region is caused. That is, the light that attempts to pass through the hole region is undesirably affected because of the existence of this spacer. From the viewpoint, it is preferable not to arrange any spacer in the hole region between the substrates of the liquid crystal panel.

However, it has been found that another failure may be caused if no spacer is arranged in the hole region between the substrates of the liquid crystal panel. This point will be described below.

Figure 7A:
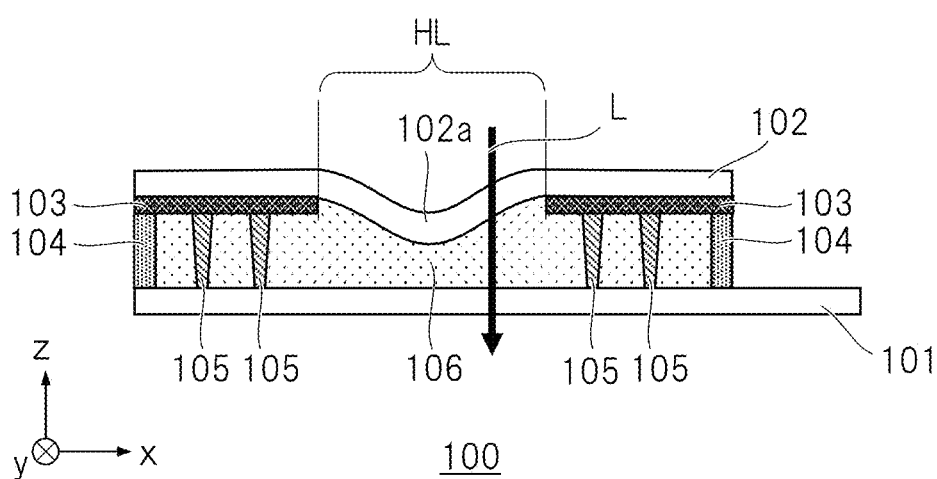
FIG. 7A is a schematic diagram of a liquid crystal panel where no spacer is arranged in a hole region.
Figure 7B:
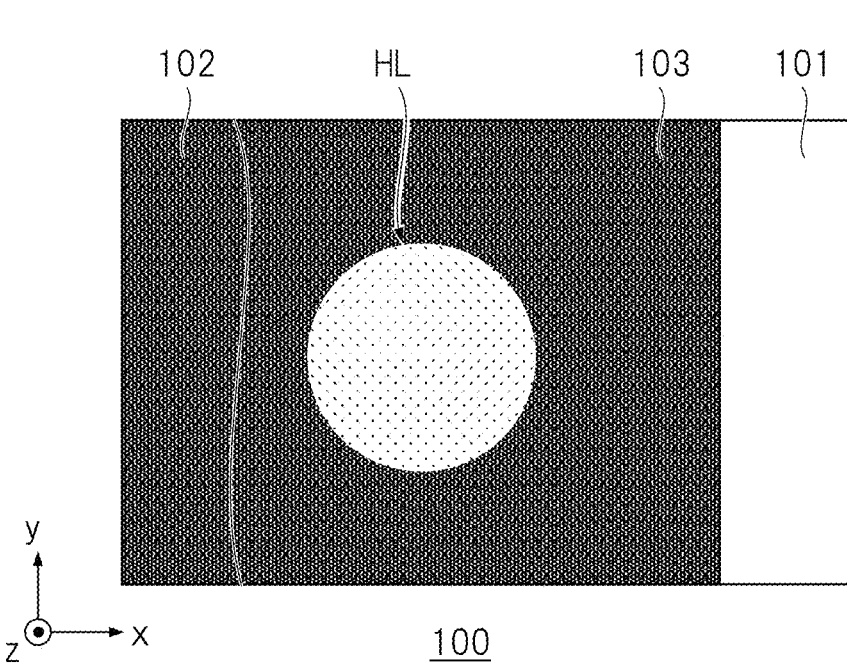
FIG. 7B is a schematic diagram of the liquid crystal panel where no spacer is arranged in the hole region.

FIGS. 7A and 7B are schematic diagrams each illustrating a liquid crystal panel where no spacer is arranged in the hole region. FIG. 7A schematically illustrates a liquid crystal panel 100 as viewed in a direction perpendicular to a light passage direction. FIG. 7B schematically illustrates the liquid crystal panel 100 as viewed in the light passage direction. Here, a direction in which the light passes through the hole, i.e., a substrate-to-substrate direction is defined as a z-direction, and two directions perpendicular to the z-direction and orthogonal to each other are respectively defined as an x-direction and a y-direction (the same applies below).

As illustrated in FIGS. 7A and 7B, the liquid crystal panel 100 includes: a first substrate 101 having a flat plate shape spreading in an x-y plane and allowing light "L" such as visible light to pass through; and a second substrate 102 arranged to face the first substrate 101 and allowing the light L such as visible light to pass through. The liquid crystal panel 100 also includes a light shielding film 103 arranged along an inner surface of the second substrate 102. A hole HL having a circular shape is formed in the light shielding film 103.

A seal part 104 extending along a peripheral edge of the second substrate 102 is attached to a region between the first substrate 101 and the light shielding film 103, and a plurality of spacers 105 are further arranged on an outer side of a region corresponding to the hole HL to be spaced apart from one another. A region surrounded by the first substrate 101, the second substrate 102, and the seal part 104 is filled with a liquid crystal 106. The spacers 105 are not arranged in the region corresponding to the hole HL between the substrates of the liquid crystal panel 100 in order to eliminate the influence on the light L that passes through the hole HL.

However, if the spacers 105 are not arranged in the region corresponding to the hole HL between the substrates of the liquid crystal panel 100, rigidity of a portion 102a of the second substrate 102, the portion corresponding to the hole HL, decreases. If the rigidity is low, the portion 102a may be deformed to have a shape recessed inward as illustrated in FIG. 7A at a substrate bonding step during the manufacture or when receiving a pressing force due to atmospheric pressure.

If the portion 102a of the second substrate 102, the portion corresponding to the hole HL, is deformed, a portion where the substrate-to-substrate distance is small occurs in the region corresponding to the hole HL in the liquid crystal panel 100, and therefore, the substrate-to-substrate distance is ununiformed. If the substrate-to-substrate distance is ununiformed in the region corresponding to the hole HL, the layer thickness of the liquid crystal 106 is ununiformed, and a light shielding factor provided when the region is set to the light shielding state is ununiformed.

Under circumstances described above, it should be understood that the technique for the liquid crystal panel having the hole region, at least a part of which is set to either the light passage state or the light shielding state, and being capable of suppressing the influence on the light that attempts to pass through the hole region has been desired.

First Embodiment

As a result of the vigorous study, the present inventors have devised the present invention to solve the above-described issues. Embodiments of the present invention will be described below. Note that each of the embodiments described below is an example for embodying the present invention, and does not limit a technical scope of the present invention. In the following embodiments, components having the same functions are respectively denoted by the same reference signs, and repetitive description thereof will be omitted unless otherwise required.

Note that each of the drawings in the present application illustrates only a principal part required to understand the feature of the structure of the liquid crystal panel in order to support the understanding of the feature, and illustration of elements such as an electrode, an electric wiring, and a semiconductor, which may be required in mounting, may be omitted.

First Example

The liquid crystal panel according to the first example includes: a seal part arranged between substrates to surround a hole region set to either a light passage state or a light shielding state and have a cylindrical shape; and a structure arranged between the substrates to be in contact with an outer surface of the seal part and surround the seal part. In the present example, a member including the seal part and having a cylindrical shape is used as the structure.

Figure 1A:
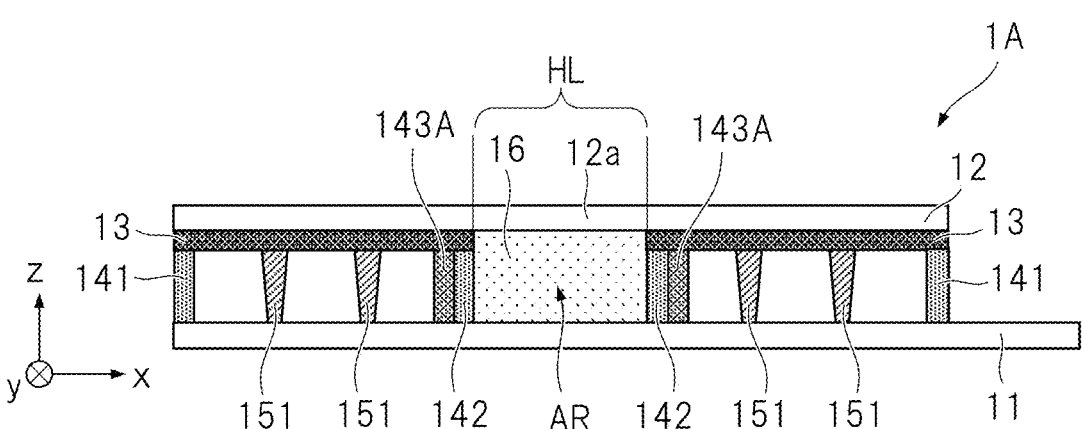
FIG. 1A is a diagram schematically illustrating a structure of a liquid crystal panel according to a first example of a first embodiment.
Figure 1B:
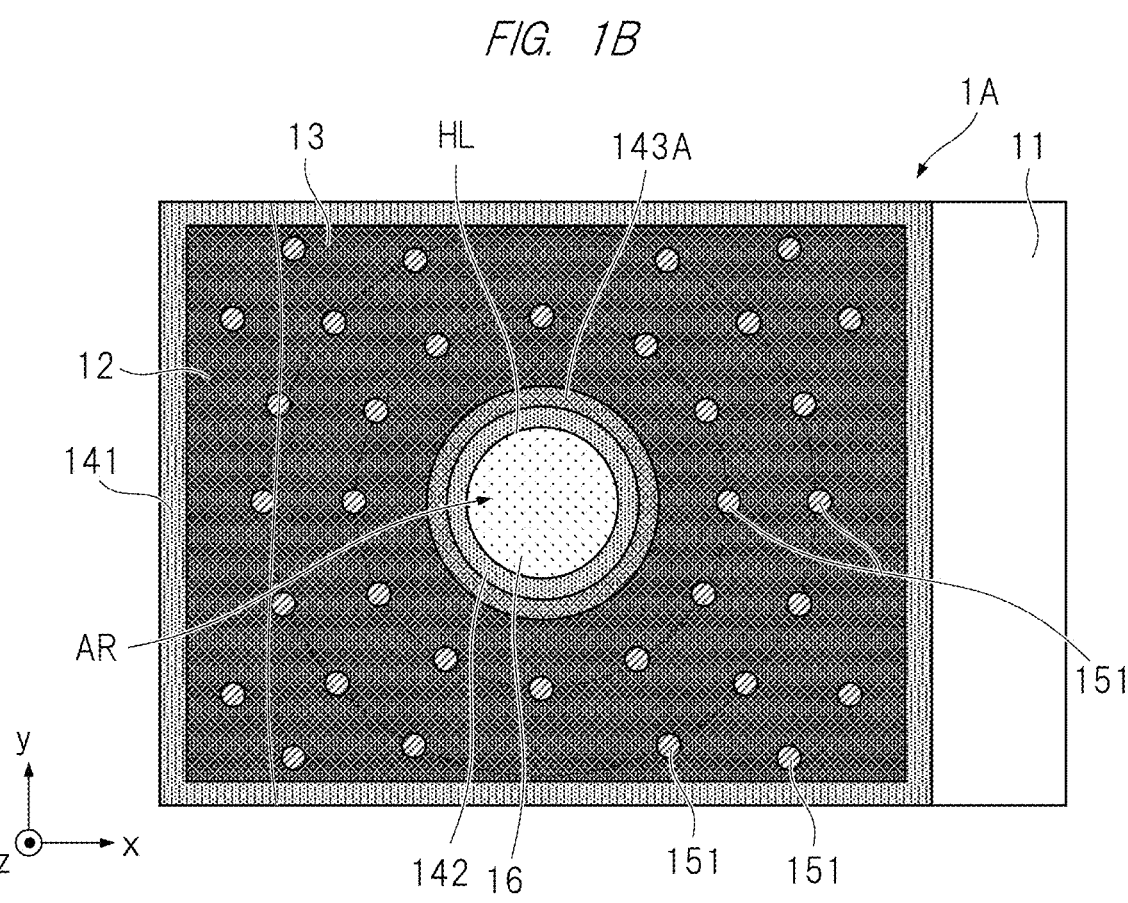
FIG. 1B is a diagram schematically illustrating the structure of the liquid crystal panel according to the first example of the first embodiment.

FIGS. 1A and 1B are diagrams each schematically illustrating a structure of the liquid crystal panel according to the first example of the first embodiment. FIG. 1A is a schematic diagram in a case of lateral view of a liquid crystal panel 1A according to the first example in the y-direction. FIG. 1B is a schematic diagram in a case of top view of the liquid crystal panel 1A in the z-direction.

As illustrated in FIG. 1A, the liquid crystal panel 1A includes a first substrate 11, a second substrate 12, a light shielding film 13, a first seal part 141, a second seal part 142, a structure 143A, a spacer 151, and a liquid crystal 16.

The first substrate 11 has a flat plate shape, and is configured to allow visible light to pass through. The second substrate 12 is arranged to face the first substrate 11, and is configured to allow visible light to pass through. The light shielding film 13 is arranged to spread along an inner surface of the second substrate 12 as illustrated in FIG. 1A, and has a hole HL having a circular shape formed therein as illustrated in FIG. 1B. The light shielding film 13 is made of, for example, a metal or resin.

The first seal part 141 is arranged along an outer edge of the second substrate 12 between substrates that are the first substrate 11 and the second substrate 12, and is tightly connected to the first substrate 11 and the second substrate 12.

Here, a region between the substrates that are the first substrate 11 and the second substrate 12, the region corresponding to the hole HL, is defined as a hole region AR. In the present example, the hole region AR has a columnar shape. The second seal part 142 is arranged along an outer periphery of the hole region AR in an x-y planar direction, and is tightly connected to the first substrate 11 and the second substrate 12. That is, the second seal part 142 is arranged between the substrates that are the first substrate 11 and the second substrate 12 to surround the hole region AR and have a cylindrical shape.

Each of the first seal part 141 and the second seal part 142 is made of, for example, an adhesive cured by ultraviolet ray. For example, in the first substrate 11, this adhesive is applied to a portion where the seal part is designed to be formed. Next, the spacer or the like is arranged in the portion of the first substrate 11 to which the adhesive has been applied, and then, the liquid crystal 16 or the like is dropped. Next, the second substrate 12 and the first substrate 11 are bonded to each other, and then, are irradiated with ultraviolet ray. In such steps, the tightly-sandwiched adhesive between the first substrate 11 and the second substrate 12 is cured by the ultraviolet ray, and is formed to be the seal part.

The structure 143A is arranged between the first substrate 11 and the second substrate 12 to be in contact with an outer surface of the second seal part 142 and surround the second seal part 142. The structure 143A is a member including the second seal part 142 and having a cylindrical shape. The structure 143A is held in tight contact with the first substrate 11 and the second substrate 12. The structure 143A is made of, for example, resin, glass, metal or the like. The structure 143A may be made of the same material as those of the first seal part 141 and the second seal part 142, such as an adhesive to be cured by ultraviolet ray.

The spacer 151 is arranged in an outer region of the hole region AR between the first substrate 11 and the light shielding film 13. As illustrated in FIGS. 1A and 1B, the number of the spacers 151 is plural, and the spacers are arranged at almost constant arrangement density to be two-dimensionally spaced apart from one another in the x-y planar direction. The spacer 151 has, for example, a columnar shape or a spherical shape. If the spacer 151 has the columnar shape, the columnar shape is a circular columnar shape, a polygonal columnar shape or the like, in which upper and lower base areas may be the same as or different from each other. The spacer 151 is made of, for example, glass, resin, metal or the like.

The liquid crystal 16 is sandwiched by the first substrate 11 and the second substrate 12, and is sealed into the cylinder made of the second seal part 142, that is, into the hole region AR. The hole region AR is set to either the light passage state or the light shielding state by control for the voltage applied between paired transparent electrodes that sandwich, in the z direction, the liquid crystal 16 sealed into the hole region AR. That is, the hole region AR is switched between the light passage state and the light shielding state, depending on whether to apply an electric field to the hole region AR in the z direction.

By individual control for each voltage applied to a plurality of paired partial electrodes resulted from division of the paired transparent electrodes, each of a plurality of partial regions divided from the hole region AR can be switched between the light passage state and the light shielding state. In other words, the hole region AR can be configured such that a plurality of hole patterns such as coded aperture used for coded imaging appears or disappears. Alternatively, when the paired transparent electrodes are shaped into a shape different from the hole HL such as a crescent moon shape or a ring shape to control the voltage applied between the transparent electrodes, the hole region AR can be switched between the light passage state in which the entire region is transparent and the light shielding state in which a partially-lacked region of the hole HL region is opaque. As a result, at least a part of the hole region AR can be set either the light passage state or the light shielding state.

In the present example, note that it is assumed that polymer dispersed liquid crystal (PDLC) is used as the liquid crystal 16 sealed into the hole region AR. The PDLC is liquid crystal containing a liquid crystal material and a polymer such as anisotropic polymer. A PDLC-type liquid crystal panel using the PDLC as the liquid crystal is a liquid crystal panel using a structure in which the liquid crystal material is phase-separated in the polymer matrix. It is assumed that the liquid crystal panel 1A according to the present example employs a vertical-orientation reverse mode PDLC type as one example of the PDLC type.

<Vertical-Orientation Reverse Mode PDLC>

Figure 2:
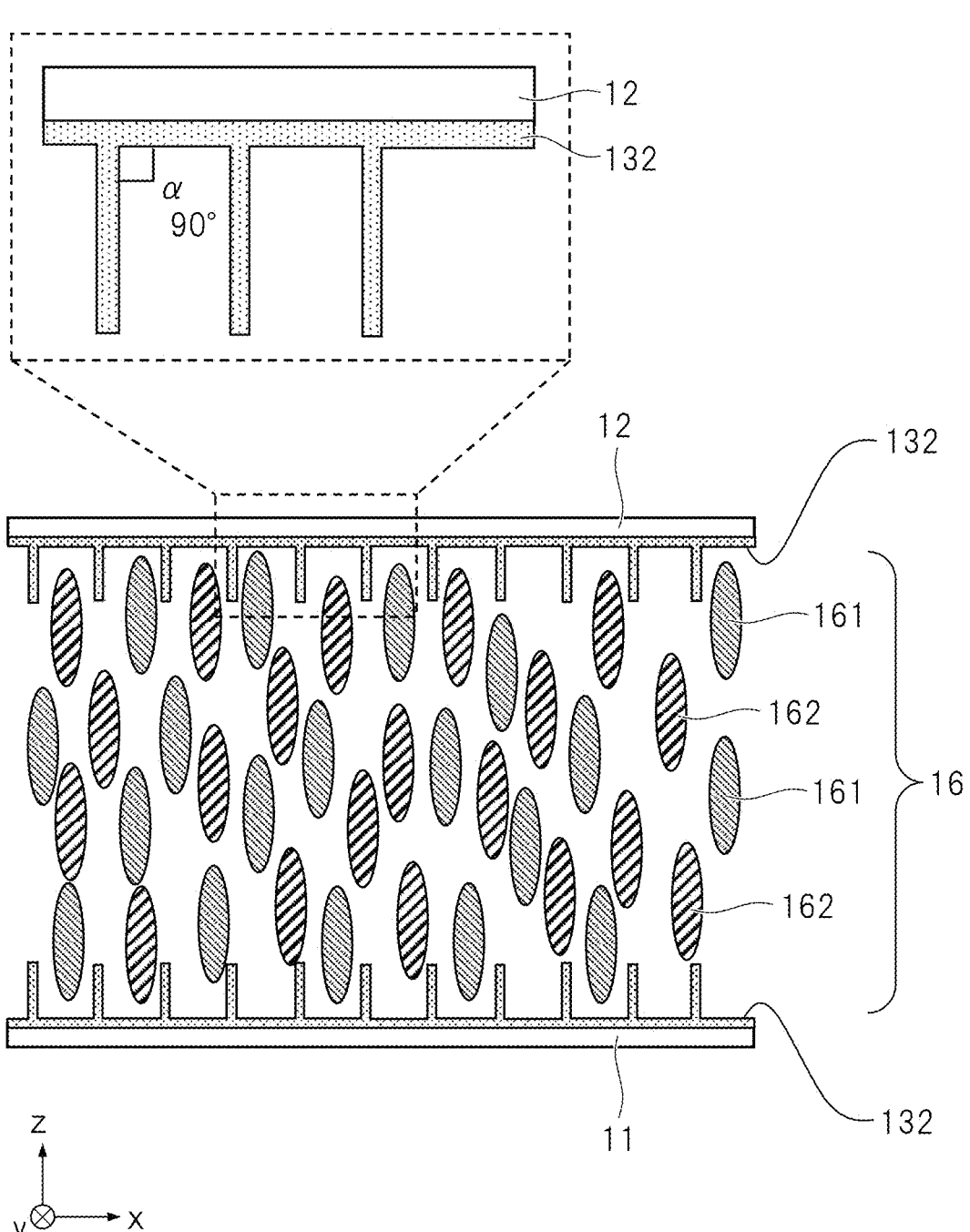
FIG. 2 is a schematic diagram illustrating a structure of a hole region in a case of view of the liquid crystal panel in a y-direction.

FIG. 2 is a schematic diagram illustrating the structure of the hole region AR in a case of view of the liquid crystal panel 1A in the y-direction. As illustrated in FIG. 2, in the vertical-orientation reverse mode PDLC type, a vertical orientation film 132 is arranged in insides of the first substrate 11 and the second substrate 12. And, a PDLC containing a liquid crystal material 161 and a polymer 162 is used as the liquid crystal 16. The polymer 162 is, for example, an anisotropic polymer. The vertical orientation film 132 is made of, for example, a polyimide-based material as similar to that of a horizontal orientation film, and is an orientation film having a pretilt angle "ax" of 90°. When the vertical orientation film 132 is used, the liquid crystal material 161 and the polymer 162 are oriented vertically to a coated surface of the vertical orientation film 132. Further, the orientation process during the manufacture of the liquid crystal panel is unnecessary.

In the vertical-orientation reverse mode PDLC type, a polymer and a liquid crystal material each having a refractive index that is different between a long-axis direction and a short-axis direction of the vertical orientation film and the polymer are used. The liquid crystal material is negative liquid crystal having a negative dielectric constant. When no voltage is applied to the PDLC, the refractive indexes of the polymer and the liquid crystal material are almost equal to each other, and the liquid-crystal sealed portion is transparent. In the contrary, when a voltage with vertical electric field is applied to the liquid crystal, the liquid crystal material is driven vertically to the electric field direction, and an orientation vector that is the refractive index is different between the polymer and the liquid crystal material, and the light is scattered at the liquid-crystal sealed portion.

In the PDLC type, a light polarizer is unnecessary, and therefore, the PDLC type has characteristics such as higher transparency of the liquid-crystal sealed portion set to the light passage state. Therefore, the PDLC-type liquid crystal panel is suitable to be used as a shutter or a diaphragm of an imager, a coded aperture or the like.

As illustrated in FIGS. 1A and 1B, in the liquid crystal panel 1A, the second seal part 142 surrounding the hole region AR is arranged in a region between substrates that are the first substrate 11 and the second substrate 12. By this structure, the liquid crystal 16 can be sealed into the second seal part 142, in other words, into the hole region AR. As a result, even if external pressure is applied to the portion 12a of the second substrate 12, the portion corresponding to the hole HL, the pressed liquid crystal 16 is supported by the second seal part 142, and therefore, the portion 12a can be suppressed from being deformed and recessed.

The structure 143A is arranged to be in contact with an outer surface of the second seal part 142 and surround the second seal part 142. By the existence of this structure 143A, the second seal part 142 is reinforced, and the portion 12a of the second substrate 12, the portion corresponding to the hole HL, can be more suppressed from being deformed. When the substrates are bonded in an ODF (one drop fill) process during the manufacture of the liquid crystal panel 1A, a possibility of breakage of the second seal part 142 cannot be denied at this time since the second substrate 12 is pressurized while the liquid crystal 16 is also pressurized. However, since the structure 143A is arranged near the second seal part 142, the structure 143A supports the second seal part 142, and the breakage of the second seal part 142 can be suppressed.

If the PDLC is dropped as the liquid crystal 16 in the ODF process, the polymer that has been cured by the ultraviolet-ray irradiation supports the portion 12a of the second substrate 12, the portion corresponding to the hole HL, and therefore, the portion 12a is difficult to be recessed. Therefore, in the hole region AR, a different member such as a spacer for supporting the portion 12a is unnecessary.

Second Example

In a liquid crystal panel according to a second example, a plurality of columnar or spherical members that are scattered around the seal part are used as a structure arranged on an outer side of the seal part surrounding the hole region and being in contact with the seal part.

Figure 3A:
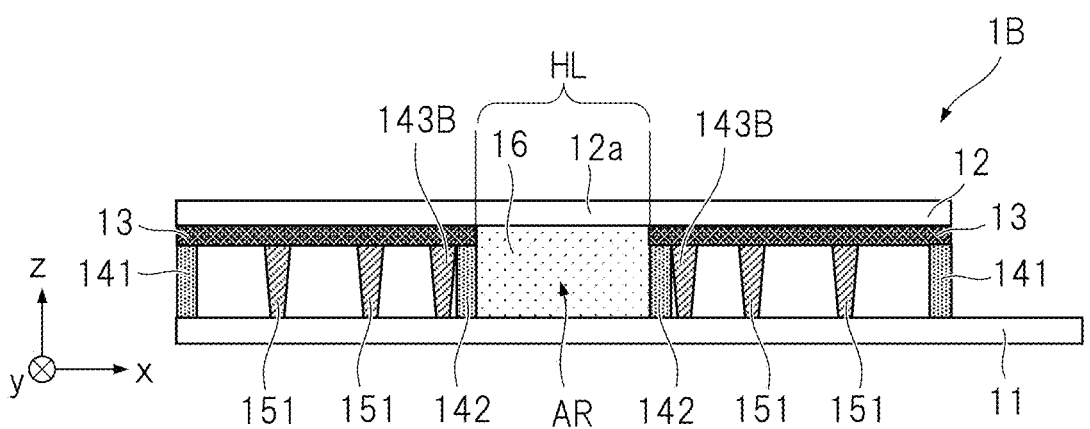
FIG. 3A is a diagram schematically illustrating a structure of a liquid crystal panel according to a second example.
Figure 3B:
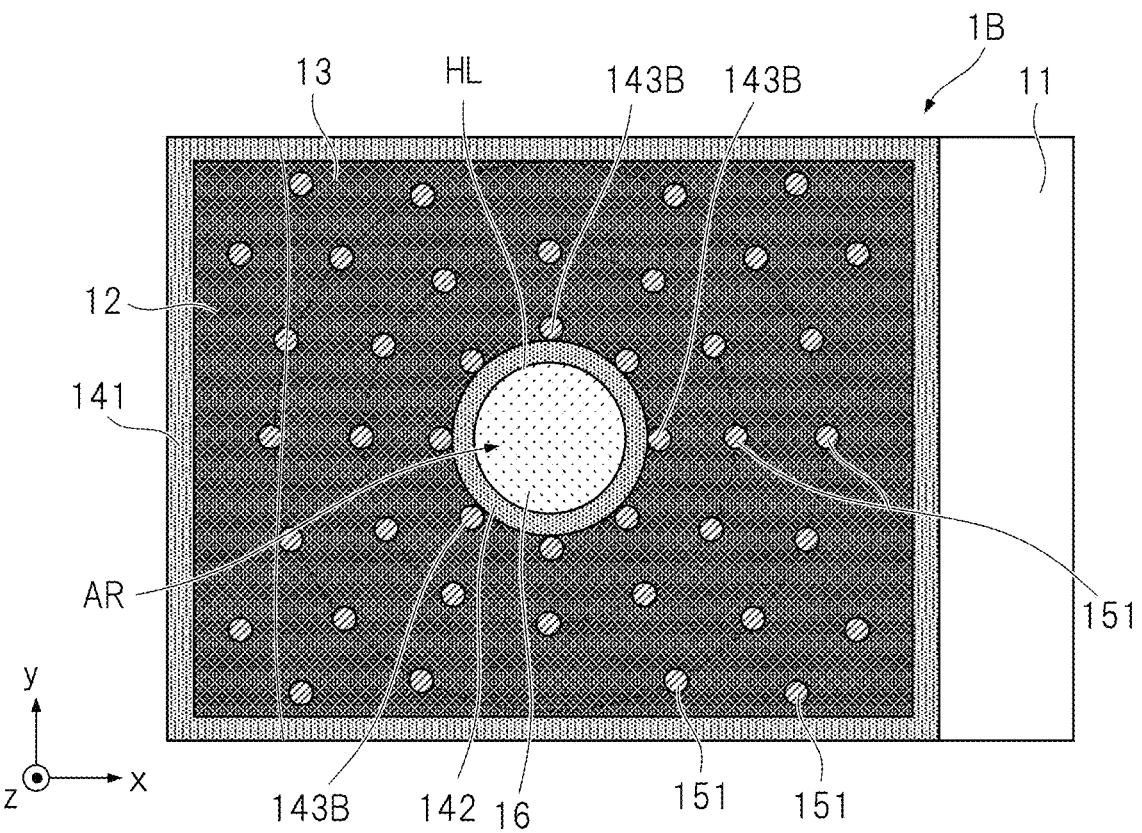
FIG. 3B is a diagram schematically illustrating the structure of the liquid crystal panel according to the second example.

FIGS. 3A and 3B are diagrams each schematically illustrating a structure of the liquid crystal panel according to the second example. As illustrated in FIG. 3A, the liquid crystal panel 1B according to the second example includes the structure 143B arranged on the outer side of the second seal part 142 surrounding the hole region AR and begin in contact with the outer surface of the second seal part 142. The structure 143B is made of the plurality of members that are scattered around the second seal part 142.

In the present example, the structure 143B is made of, for example, a plurality of spacers. Each spacer configuring the structure 143B has, for example, a columnar shape or spherical shape as similar to that of the spacer 151. If each spacer configuring the structure 143B has the columnar shape, its upper and lower base surfaces are bonded to the first substrate 11 and the second substrate 12. Note that each spacer configuring the structure 143B may be of the same shape and material as those of the spacer 151, in other words, may be a component of the same type as that of the spacer 151.

In the liquid crystal panel 1B configured as described above, the second seal part 142 is supported by the structure 143B. Therefore, as similar to the first example, even if the second substrate 12 is pressurized while the liquid crystal 16 is pressurized in the ODF process, the phenomena of the breakage of the second seal part 142 can be suppressed. Further, when the component of the same type as that of the spacer 151 is used as the structure 143B in the second example, the component can be differently used to reduce the number of the types of the components configuring the liquid crystal panel, and the manufacturing cost of the liquid crystal panel can be reduced.

Third Example

In a liquid crystal panel according to a third example, the hole region and a peripheral region adjacent to the hole region have the same structures as those of the first or second example. However, an outer region of the peripheral region has a different display panel structure. As the different display panel, for example, a display panel using an organic EL light emitting diode (OLED), a micro light emitting diode (μLED) or the like is considered.

Figure 4A:
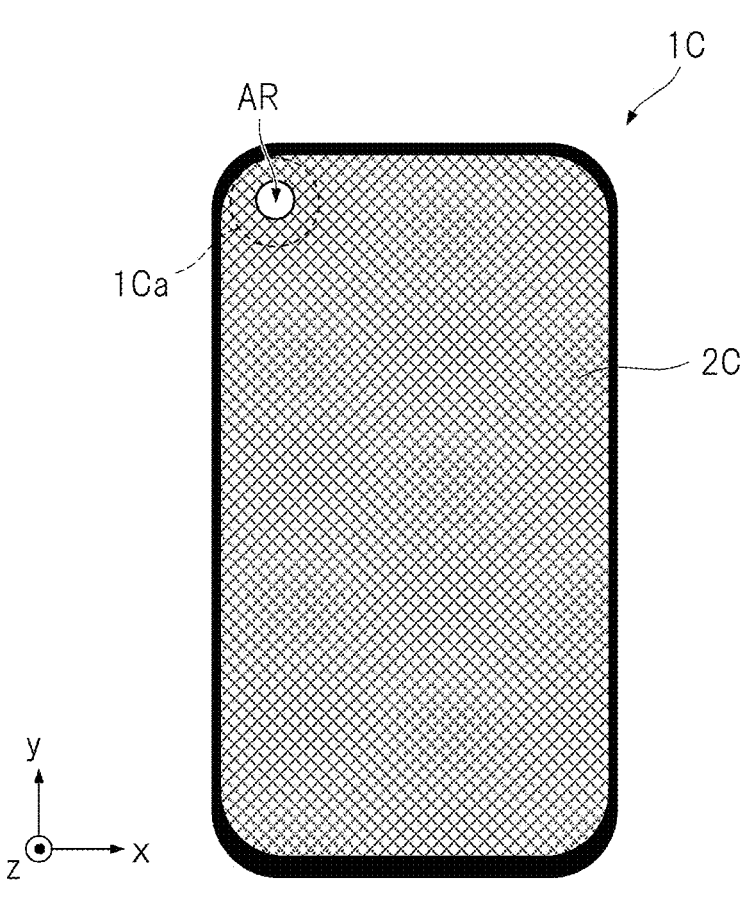
FIG. 4A is a diagram schematically illustrating a structure of a liquid crystal panel according to a third example.
Figure 4B:
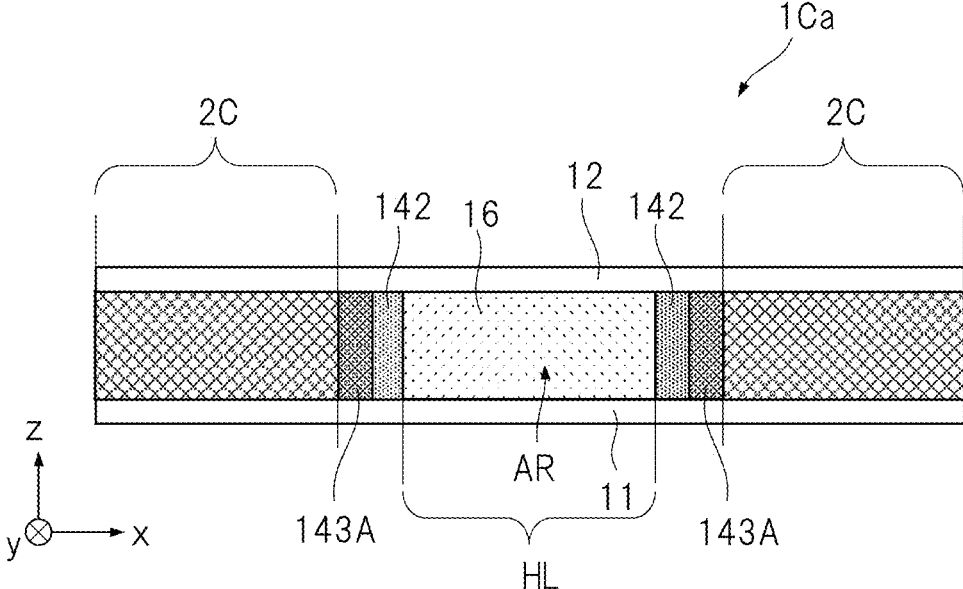
FIG. 4B is a diagram schematically illustrating the structure of the liquid crystal panel according to the third example.

FIGS. 4A and 4B are diagrams each schematically illustrating a structure of the liquid crystal panel according to the third example. FIG. 4A is a diagram illustrating the entire liquid crystal panel 1C, and FIG. 4B is a diagram illustrating a partial region 1Ca including the hole region AR. As illustrated in FIGS. 4A and 4B, in the liquid crystal panel 1C according to the third example, the hole region AR and the peripheral region adjacent to the hole region AR have the same structures as those of the first or second example. On the other hand, in the liquid crystal panel 1C, the outer region of the peripheral region of the hole region AR has no light shielding film 13 but has the display panel 2C using the OLED or the μLED.

In the liquid crystal panel 1C configured as described above, the hole region AR can be used as the optical shutter or the coded aperture of the imaging mechanism, and a device using the display panel 2C as a display screen of the image display mechanism can be achieved. As this device, for example, a smartphone, a tablet terminal, a notebook computer or a laptop computer, a face recognition system or the like is considerable.

According to the above description, the liquid crystal panel according to the first embodiment is configured to include: the seal part arranged to surround the hole region and having the cylindrical shape; and the structure arranged between the substrates to be in contact with the outer surface of the seal part and surround the seal part, and the liquid crystal is sealed into the cylinder configuring the seal part. Therefore, in the liquid crystal panel according to the first embodiment, the hole region does not include the structure such as the spacer that may cause the orientation disturbance of the liquid crystal, and the rigidity of the substrates even without such a structure can be maintained by the seal part. As a result, even if the substrates are pressurized by the substrate bonding step during the manufacture of the liquid crystal panel or by the atmospheric pressure or the like, the deformation of the substrates can be suppressed, and the ununiformed, in other words, the uneven substrate-to-substrate distance can be suppressed.

Since the structure is arranged to make contact with the outer surface of the seal part, the rigidity of the seal part is reinforced. Therefore, even if the liquid crystal is pressed through the substrates in the substrate bonding step in the course of the manufacturing or by the atmospheric pressure or the like, the phenomena of the breakage of the seal part can be made difficult to be caused.

That is, according to the liquid crystal panel according to the first embodiment, while at least a part of the hole region is set to either the light passage state or the light shielding state, the influence on the light designed to transmit the hole region can be suppressed.

Second Embodiment

<Liquid Crystal Panel Apparatus According to Second Embodiment>

A liquid crystal panel apparatus according to a second embodiment includes: the liquid crystal panel according to any one of the examples; and a controller controlling a voltage applied to the liquid crystal inside the hole region of this liquid crystal panel.

Figure 5:
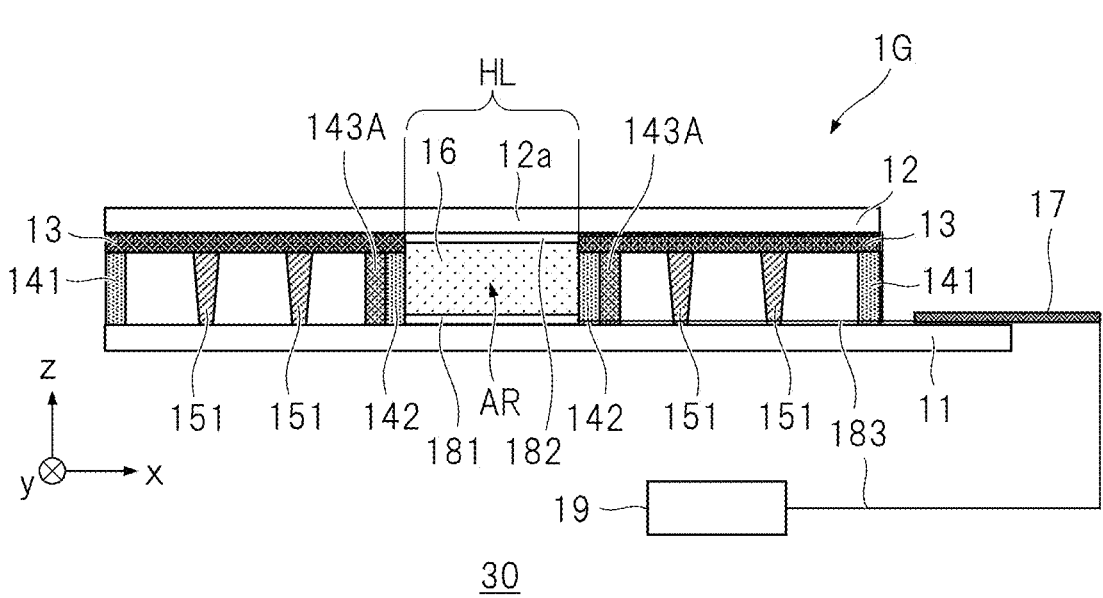
FIG. 5 is a diagram schematically illustrating an example of a liquid crystal panel apparatus according to a second embodiment.

FIG. 5 is a diagram schematically illustrating an example of the liquid crystal panel apparatus according to the second embodiment. The liquid crystal panel apparatus 30 illustrated in FIG. 5 includes the liquid crystal panel 1G and the controller 19.

The liquid crystal panel 1G includes the first substrate 11, the second substrate 12, the light shielding film 13, the first seal part 141, the second seal part 142, the structure 143, the spacer 151, and the liquid crystal 16, as similar to the liquid crystal panel 1A according to the first example. The liquid crystal panel 1G further includes a flexible substrate 17, electrodes 181 and 182, and an electric wiring 183. Note that the structure 143 may be the spacer as described in the second example.

The flexible substrate 17 is attached to the first substrate 11. The electrodes 181 and 182 are each a so-called transparent electrode that is an electrode made of a material that allows visible light to pass through and allows electricity to flow. The electrode 181 is arranged inside the first substrate 11 in the hole region AR corresponding to the hole HL. The electrode 182 is arranged inside the second substrate 12 in the hole region AR. The electric wiring 183 is arranged to electrically connect the electrodes 181 and 182 and the flexible substrate 17 to each other, and is arranged to electrically connect the flexible substrate 17 and the controller 19 to each other.

The controller 19 further has a function of applying the voltage between the electrode 181 and the electrode 182 via the flexible substrate 17 and the electric wiring 183. The controller 19 controls the orientation of the liquid crystal 16 by controlling the voltage to be applied to the electrodes 181 and 182 to set the hole region AR of the liquid crystal panel 1G into either the light passage state or the light shielding state. Note that the controller 19 is made of, for example, an electronic circuit, a semiconductor circuit, a dedicated IC chip, a programmable IC chip, a micro controller, a computer or the like.

In the liquid crystal panel apparatus 30 according to the second embodiment, by the controller 19 that controls the voltage to be applied to the liquid crystal 16, the hole region AR corresponding to the hole HL of the liquid crystal panel 1G can be set into the light passage state or the light shielding state. Therefore, the liquid crystal panel apparatus 30 is usable as the shutter, the coded aperture, or the diaphragm when the liquid crystal panel 1G is positioned, for example, in front of or behind the optical system of the imager.

Third Embodiment (Imager According to Third Embodiment)

An imager according to a third embodiment includes the optical system, the liquid crystal panel apparatus according to the second embodiment, and an imaging element that receives light that has passed through the optical system and the hole region of the liquid crystal panel apparatus.

Figure 6:
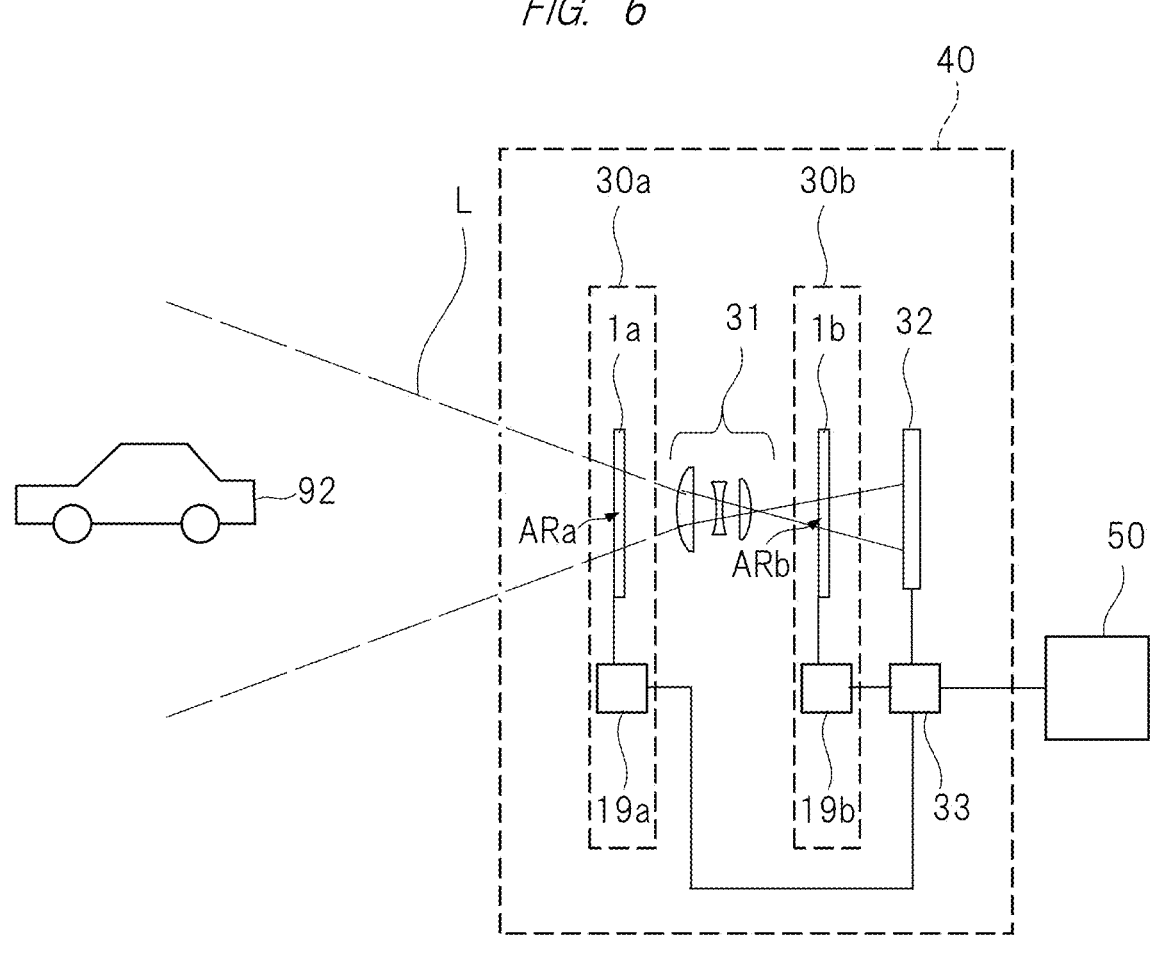
FIG. 6 is a diagram schematically illustrating an example of an imager according to a third embodiment.

FIG. 6 is a diagram schematically illustrating an example of the imager according to the third embodiment. An imager 40 illustrated in FIG. 6 includes liquid crystal panel apparatuses 30a and 30b, an optical system 31, an imaging element 32, and a general controller 33.

The liquid crystal panel apparatuses 30a and 30b each have a similar configuration to that of the liquid crystal panel apparatus according to the second embodiment. The liquid crystal panel apparatus 30a includes a liquid crystal panel 1a having a hole region ARa and a controller 19a electrically connected to the liquid crystal panel 1a. The liquid crystal panel apparatus 30b includes a liquid crystal panel 1b having a hole region ARb and a controller 19b electrically connected to the liquid crystal panel 1b. The liquid crystal panel 1a is arranged in front of the optical system 31, i.e., is arranged on a target object 92 side. The liquid crystal panel 1b is arranged behind the optical system 31. The imaging element 32 is arranged further behind the liquid crystal panel 1b.

The imaging element 32 is an imaging sensor in which opto-electric converter elements are two-dimensionally arranged to form a light receiving surface. As the imaging element 32, for example, a CCD imaging sensor, a CMOS imaging sensor or the like is considerable. Note that some imaging sensors are of a type that outputs an analog signal or a type that converts the analog signal to a digital signal, and then, outputs image data.

The general controller 33 is electrically connected to the controllers 19a and 19b and the imaging element 32. To the controllers 19a and 19b, the general controller 33 transmits a control signal for independently setting the respective hole regions ARa and ARb into the light passage state or the light shielding state. By transmitting the control signal, the general controller 33 makes the hole region ARa of the liquid crystal panel 1a functional as the shutter or the coded aperture, and makes the hole region ARb of the liquid crystal panel 1b functional as the shutter or the diaphragm. The general controller 33 receives an output signal of the imaging element 32.

That is, by controlling the liquid crystal panel apparatus 30a and the liquid crystal panel apparatus 30b, the general controller 33 captures an image of the target object 92, and acquires an image signal of the target object 92 obtained by the imaging from the imaging element 32. Note that the imaging to be performed is not limited to standard imaging, but may be special imaging such as coded imaging.

The general controller 33 is electrically connected to an external apparatus 50. The general controller 33 performs the imaging based on a command signal from the external apparatus 50, and generates image data based on the image signal obtained by the imaging and transmits the generated image data to the external apparatus 50. Note that the general controller 33 is made of, for example, an electronic circuit, a semiconductor circuit, a dedicated IC chip, a programmable IC chip, a micro controller, a computer or the like. The external apparatus 50 may be any apparatus if the apparatus handles the image data, such as a driving assist apparatus mounted on a vehicle such as an automobile.

In the imager 40 according to the third embodiment, the liquid crystal panel can be used as the shutter, the coded aperture or the diaphragm.

In the foregoing, various embodiments and various examples of the present invention have been explained. However, the present invention is not limited to the foregoing embodiments, and include various modification examples. Also, the above-described embodiments have been explained for supporting the understandable explanation of the present invention, and are not always limited to the one including all structures explained above. Also, a part of the structure of one embodiment can be replaced with the structure of another embodiment, and besides, the structure of another embodiment can be added to the structure of one embodiment. All these elements belong to the scope of the present invention. Further, the numerical values included in the texts and the drawings and the like are also described as only one example, and the usage of the different values or the like does not lose the effects of the present invention.

What is claimed is:

1. A liquid crystal panel apparatus comprising:
a first substrate having a flat plate shape and allowing light to pass through;
a second substrate arranged to face the first substrate and allowing light to pass through;
a liquid crystal sandwiched between the first substrate and the second substrate; and
a controller controlling a voltage applied to the liquid crystal,
wherein the liquid crystal panel apparatus further includes:
a hole region, at least a part of which is set to either a light passage state or a light shielding state, the hole region being arranged between substrates that are the first substrate and the second substrate;
a seal part arranged between the substrates to surround the hole region and have a cylindrical shape; and
a structure arranged between the substrates to be in contact with an outer surface of the seal part and surround the seal part, the liquid crystal is sealed into the cylinder configuring the seal part,
the controller sets at least the part of the hole region to either the light passage state or the light shielding state by controlling the voltage,
the hole region has a circular columnar shape, and
the structure comprises a plurality of columnar members scattered around the seal part and each being in contact with the seal part, wherein diameters at both ends of each columnar member are the same or a diameter at one end is smaller than a diameter at the other end,
the liquid crystal panel apparatus further comprises
a plurality of spacers arranged in an outer region of the seal part between the substrates to be spaced apart from one another,
wherein the structure is a component of the same type as a type of the spacer.

2. The liquid crystal panel apparatus according to claim 1 further comprising
a light shielding film arranged to spread along an inner side of the second substrate and having a hole formed therein.

3. The liquid crystal panel apparatus according to claim 1 further comprising
a display panel arranged on an outer side of the structure and using an organic EL light emitting diode or a micro light emitting diode.

4. The liquid crystal panel apparatus according to claim 1, wherein the liquid crystal is polymer dispersed liquid crystal.

5. The liquid crystal panel apparatus according to claim 1, wherein the hole region is configured such that a coded aperture appears.

6. An imager comprising:
an optical system;
the liquid crystal panel apparatus according to claim 1; and
an imaging element receiving light that has passed through the optical system and the hole region of the liquid crystal panel apparatus.

7. The imager according to claim 6, wherein the hole region is configured such that a coded aperture appears.

* * * * *